United States Patent Office 3,393,080
Patented July 16, 1968

3,393,080
MICROCRYSTALLINE COLLOIDAL COLLAGEN DISPERSIONS IN DISPERSING MEDIA CONTAINING DIMETHYL SULFOXIDE AND WATER - MISCIBLE ORGANIC SOLVENTS
Nicholas Z. Erdi, New York, N.Y., Charles F. Ferraro, Trenton, N.J., and Orlando A. Battista, Yardley, Pa., assignors to FMC Corporation, New York, N.Y., a corporation of Delaware
No Drawing. Filed Oct. 20, 1965, Ser. No. 499,077
9 Claims. (Cl. 106—161)

ABSTRACT OF THE DISCLOSURE

Stable colloidal dispersions of water-insoluble microcrystalline collagen in dispersing media consisting of (a) dimethyl sulfoxide, (b) mixtures of water and dimethyl sulfoxide, (c) dimethyl sulfoxide-free mixtures of water and up to 65% by weight of a water-miscible organic solvent or (d) mixtures of water, dimethyl sulfoxide and up to 75% of at least one other water-miscible organic solvent. The colloidal dispersions are formed by treating collagen with a dilute acid and attriting until at least 10% by weight of the collagen has been reduced to a colloidal submicron size and dispersing such attrited material in a dispersing media or alternatively the collagen may be treated with the dispersing media containing the acid and attriting in the presence of the dispersing media.

This invention relates to colloidal dispersion of microcrystalline water-insoluble collagen in mixtures of water and water-miscible organic solvents, and organic-inorganic hybrid polar solvents such as dimethyl sulfoxide.

Collagen is the principal building block of the hides and skins of most mammals, including man, and its principal source is hide substance. It also is the chief constituent of many other parts of the body, such as the intestinal walls, etc. In addition to its principal use—in the manufacture of leather—collagen is also widely used in the preparation of such materials as glue and gelatin. More recently, much study has been directed to the solubilization of collagen and its reconstitution from solution as fibers for use as sutures and fibrous mats for various purposes.

The elementary basic molecular unit of collagen is tropocollagen, sometimes called procollagen. This unit has been isolated and electron micrographs made, so that its constitution is well understood. The macromolecules consist of three polypeptide chains coiled together in a long helix, about 10 to 15 angstrom units in diameter and about 3,000 angstrom units (0.3 micron) long. Tropocollagen is insoluble in neutral water, but is soluble in certain salt solutions and in dilute acid at about pH=3. Much of the work done in the production of reconstituted collagen products has involved the production of tropocollagen while avoiding degradation of the unit to glue or gelatin. A typical example of this work is disclosed in the Artandi U.S. Patent 3,157,524, issued Nov. 17, 1964.

The next higher organized state in which collagen has heretofore been known is the collagen fibril, which consists of long, thin strands comprising thousands of individual tropocollagen units; the fibrils are several hundred to a thousand angstrom units in diameter, and vary in length, generally being tens of microns long. In this form, the collagen is water-insoluble, not only at the neutral point but also in acidified water at pH=3. It is these fibrils which associate to form the microscopic fibers present in natural substances and which fibers comprise many thousands of fibrils bonded together.

In co-pending Battista application S.N. 436,371, filed Mar. 1, 1965, it is disclosed that it is possible to produce a form of collagen intermediate between that of collagen fibrils and tropocollagen, which has uniquely useful properties in that it can be swollen with water into gels which retain substantially their original viscosity on standing for a week or more and which can be worked up into useful shaped products. This new form of collagen is microcrystalline and colloidal; it consists of bundles or tightly packed aggregates of hundreds of tropocollagen units which vary in length from that of an individual tropocollagen unit to just under one micron, and vary in diameter from about twenty-five angstrom units to some hundreds of angstrom units. They have the unique property of being dispersible in water at pH=3 without being soluble therein. Compositions containing this new form of collagen, and free of forms of collagen which are soluble in water at pH=3, which compositions contain at least 10% by weight of these new submicron microcrystalline colloidal particles, produce viscosity-stable, useful aqueous gel dispersions at low concentrations of the order of 1%. This is in sharp contrast to the type of aqueous gel formed by tropocollagen in acid medium and by degraded forms of collagen such as gelatin. The gels formed by these acid-and-water-soluble forms of collagen thicken on standing, even at low concentrations, to produce rubbery masses so that their utility is sharply curtailed by this lack of stability. Moreover, the new form of collagen described in this application forms gels with substantially higher viscosity at much lower percentages of solids than for tropocollagen or gelatin.

In making this new microcrystalline colloidal collagen one starts with any undenatured collagen in the natural state, either as pieces of the original hide, gut, or other high-collagen source, but preferably with pieces dried under non-denaturing conditions and chopped up for easier handling. The product is treated under carefully controlled conditions with very dilute acid—at a hydrogen ion concentration of from about 0.0025–0.025 mol/liter—and then mechanically disintegrated wet, in the presence of the dilute acid, until about 10% or more of the material is reduced to submicron size. It is not essential that all the source material be reduced to submicron size. The product becomes useful when about 10% has been so reduced, although optimum results are obtained at somewhat higher concentrations of the submicron microcrystalline material.

In producing this product, it is essential that the starting material be undenatured. There have been used fresh cowhides and calfhides, salted-down cowhides, wet moosehide, and sun-dried pigskins, sheepskins, and goatskins such as are conventionally used for making leather, as well as a special technical hide collagen prepared from hide splits and possessing a minimal reduced bacterial count (circa 200–4000 bacteria per square inch). In general, if a hide is in such condition that it can be wet back for use in tanning to produce satisfactory leather, it is useful for producing microcrystalline colloidal collagen and the attendant stable dispersions. The preferred raw material, because of its wide availability and low cost, is obviously cowhide or technical grades of collagen prepared from cowhide.

In preparing the crude cowhides for use herein, it is obviously desirable to remove hair and flesh, so that they will not introduce impurities which must later be removed. It has been found advantageous to use degrained hide especially when refined stable dispersions are desired since degraining removes some tightly bound impurities.

When operating next to an abattoir, the hides or other parts may be processed fresh. However, it is desirable to use dry hides, for easier control of processing. Solvent extraction of the water in known fashion may be practiced; it is preferable to freeze-dry the wet hides, and sublime the water off under vacuum. This technique has marked advantages in insuring uniformity of raw material as well as convenience and stability in storing and handling.

The hide substance is preferably chopped up before treatment for ease of handling. Preferably, it is ground to reasonable fineness, to insure more uniform reaction, and less work in the ultimate comminution to submicron size. It should be noted that stable microcrystalline colloidal dispersions of the untreated hide substance cannot be obtained without the appropriate chemical pre-treatment using carefully controlled acid conditions in combination with the minimum amount of mechanical disintegration.

For making microcrystalline colloidal collagen, one essential pre-treatment is a thorough soaking of the hide substance with the appropriate very dilute acid. The concentration needed with any particular acid varies with its composition and strength; the resultant products are more or less useful, depending on these factors.

With hydrochloric acid, at least about 0.0025 N HCl solution is needed to produce microcrystalline colloidal collagen from typical vacuum freeze-dried cowhide. Optimum results are obtained with close to 0.01 N solutions; thereafter the products become somewhat less desirable and where over .025 N HCl solutions are used, degradation of molecular weight occurs with an attendant build-up of acid-soluble tropocollagen, and the desired properties of the gels are lost.

The purpose of the dilute-acid treatment is to partially hydrolize the collagen fibrils so that they will more readily form microcrystalline fragments with dimensions intermediate between tropocollagen and fibrils when mechanically disintegrated. Mild acid concentrations allow control of the extent of hydrolysis and mixing time and shear conditions allow control of the mechanical attrition. Both are essential in production of dispersions of microcrystalline colloidal collagen. An acid such as hydrochloric acid is concentrated in minute quantities in an acid base reaction at active sites of the collagen molecules, the exact nature of this chemical reaction being unknown. When loadings of 5% or more of collagen are used in making dispersions, sufficient acid is used up so that somewhat higher concentrations of acid are necessary to produce the desired reaction. For example, at concentrations of 7.5% collagen .03 N HCl works well, while concentrations of over .04 N produce an unsatisfactory product which is over-hydrolized. With concentrations of 1% collagen, the .03 N HCl is too strong.

While the product of this co-pending application is useful in producing a wide variety of materials, the product has certain disadvantages. The aqueous gels made from the product are not resistant to bacterial action, so they must be treated with bactericides, which are both expensive and sometimes undesirable. Moreover, there is marked difficulty in the removal of water because of the relatively low concentration of collagen in the gels. The spinning of fibers and the extrusion of films from these gels are also handicapped by the relatively long coagulation time involved. In addition, the gels tend to build up an apparent viscosity very rapidly, as the concentration goes up, so that gels with substantial percentages of collagen are relatively difficult to handle.

This invention has as its principal object the provision of colloidal dispersions of this new microcrystalline water-insoluble collagen which overcome all of these difficulties, and produce not only more concentrated dispersions at the same apparent viscosity but also produce compositions which resist bacterial action and are more readily coagulated and/or dried.

We have made the surprising discovery that water-miscible organic solvents, on being added to aqueous dispersions of this form of collagen, do not precipitate as would be expected but first actually thin out the dispersion somewhat. As the amount of water-miscible solvent is added, one finally reaches a concentration where the collagen precipitates. This varies with the solvent and for any solvent with the concentration of the collagen in the system. In general, the useful range for solvent concentration is up to about 65 parts by weight. While even very small amounts of additional solvent serve the purpose of preventing bacterial action, the other advantages of the use of added solvent are not obtainable below about 20% solvent by weight. In general, we prefer to operate with 25–35% organic solvent in order to prevent possible local concentration of substantially above 65%, which can cause precipitation of the collagen.

Dimethyl sulfoxide is an exception to the general rule in that it will not cause precipitation even when used alone, acting more like water than like the ordinary water-miscible organic solvents. Moreover, when it is used in conjunction with water, it permits the incorporation of more than 50% of additional organic solvent. Thus a 50% isopropanol/50% water medium is on the edge of precipitation. On the contrary, a 50% isopropanol/25% dimethyl sulfoxide/25% water mixture gives a clear homogeneous dispersion; in fact, the percentage of isopropanol can be substantially increased, in this instance up to about 75%. Dimethyl sulfoxide alone is a good dispersing medium. However, when water-miscible organic solvents such as isopropanol are added to dimethyl sulfoxide in the absence of water, then the addition of as little as about 25% isopropanol to the dimethyl sulfoxide will cause precipitation of the microcrystalline collagen.

Not only can the water-miscible solvent be added to an already existing dispersion, but the product can be made by direct treatment of hide substance with a mixture of dilute aqueous-acid and the water-miscible solvent at the optimum concentration of acid, water, and solvent in conjunction with the required mechanical disintegration treatment.

We have found that the phenomenon discussed above is general for substantially all water-miscible solvents, with the above-mentioned exception for dimethyl sulfoxide. We have investigated aliphatic alcohols, such as methanol, ethanol, isopropanol, n-propanol; cyclic alcohols such as tetrahydrofurfuryl alcohol, and furfuryl alcohol; water-soluble ethers such as dioxane and tetrahydrofurane; and ketones such as acetone and methylethyl ketone.

As indicated above, the dispersions of this invention can be made either by adding the solvent after an aqueous gel of microcrystalline colloidal collagen has been made or by adding the solvent directly to the starting mixture of hide and dilute acid. The second of these methods invariable yields a dispersion of lower viscosity. This difference in viscosity becomes more marked as the concentration increases and/or the temperatures increase up to about 80° C.

The use of increases in temperature above ambient temperatures up to about 80° C. to control viscosity temporarily is an unexpected advantage of this invention. It is known that high temperatures tend to denature collagen very rapidly and tropocollagen gels, if heated even up to 50° C., drop off very rapidly in apparent viscosity after reversion to ambient temperature, indicating denaturation of the collagen. With the compositions of this invention, however, heating of the gels for a limited period of time merely acts to stabilize the viscosity at a slightly lower figure than in the absence of heat. In the practice of this invention ambient temperatures are ordinarily employed. However, because of the stability of the materials to some degree of heating, it is not ordinarily necessary to cool even high-energy comminution equipment, the use of which would result in denaturing of tropocollagen because its temperatures increase in the equipment.

As pointed out in application S.N. 436,371, stable dispersions of microcrystalline colloidal collagen are prepared by treating the product with very dilute acid at concentrations of from about 0.0025 mol/liter up to about 0.025 mol/liter for low concentrations of collagen, and very slightly higher for higher concentrations of collagen, followed by appropriate mechanical disintegration until at least 10% of the material is reduced to microcrystals or aggregates of microcrystals of submicron size. Optimum results are obtained with close to 0.01 N HCl in the case of 1% concentrations of collagen, and about .025 N HCl at 6% to 7½% of collagen. The hide material, preferably shredded, is disintegrated in an appropriate machine. The Waring Blendor and the Rietz extructor are the preferred equipment, acting more rapidly than such machines as the Cowles dissolver or the Bauer refiner. In general, the preferred disintegrating equipment subjects the particles of treated collagen to high shear against each other, causing disruption and effective rapid reduction in size. The Waring Blendor and the Cowles dissolver do this by imparting a high velocity to the particles; but the high shear can be imparted in other ways, as by extrusion through tiny orifices, or other known techniques.

As indicated in application S.N. 436,371, other acids can be substituted for hydrochloric acid, with some loss of flexibility and ease of control. With other acids, control may be very difficult (as with sulfuric acid) or merely difficult (as with acetic acid, hydrobromic acid, and cyanoacetic acid) all of which give less satisfactory but acceptable products and are useful in much narrower ranges of concentration.

One of the major advantages of this invention is that these solvent-containing gels are completely free from bacterial attack and are stable in viscosity, not only over extended periods of time but over all likely storage temperatures, even in the summer. The other major advantage of using organic solvent diluents is that fibers can be dry-spun and films can be dry-cast, because the organic solvents generally have a lower boiling point and lower heats of evaporation than water and thus the drying time is shortened. This is particularly true where articles are to be dip-coated.

Other advantages are: (1) The solvent gels are more easily de-aerated than the aqueous gels, and (2) the solvents can be used as carriers for additives, such as cross-linking agents, thermal stabilizers, dyes, photosensitive compounds, and the like, some of which tend to be water-insoluble.

The following specific examples are typical of the invention but are not meant to be limiting thereto. In the examples all of the viscosities were measured with a Brookfield Model HBT viscosimeter using a T-bar spindle at 10 r.p.m. and 25° C.

Example 1

A mixture of 3.33 grams of ground, freeze-dried cowhide was soaked in 96.67 grams of 0.01 N HCl for 15 minutes at 30° C., then attrited in a Waring Blendor for 15 minutes below 30° C. The product was a milky white, thick, stable gel with an apparent Brookfield viscosity of 680,000 centipoises.

To 60 grams of the product was added 40 grams of C.P. grade isopropanol. The mixture was blended for 5 minutes in a Waring Blendor, at a temperature below 30° C. This formulation contained 2.0 percent of collagen based on the total mixture. The product was a stable dispersion with an apparent Brookfield viscosity at 25° C. of 110,000 centipoises, which is about one-sixth the viscosity of the dilute acid-aqueous parent gel.

The product is useful in cosmetics. It was a creamy, translucent dispersion that could be spread easily on the skin. Isopropanol dispersions are useful bases for facial creams, suntan lotions, deodorants, shampoos, and hair dressings of various kinds. Other solvents can be substituted for isopropanol in these applications or added to it in order to modify properties in specific applications. In suntan lotions, for example, it may be desirable to use additives or solvents that are absorbers of ultraviolet light.

Isopropanol dispersions are also useful in ointments and medicinals. Isopropanol itself is an antiseptic, and collagen can be assimilated by the skin or the area of a wound. The dispersion prepared as described in this example is an excellent antiseptic cream.

Example 2

A mixture of 10 grams of ground, freeze-dried cowhide and 990 grams of 0.01 N HCl was blended in a Cowles dissolver, Model 1-VG (Cowles Dissolver Co., Inc., Los Angeles, Calif.) for 15 minutes. The mixture was water-cooled to keep the temperature below 30° C. The product was a thick, stable gel with an apparent viscosity of 42,900 centipoises.

To 750 grams of the product was added 250 grams of 1,4-dioxane, a water-soluble ether, and the whole was blended for 20 minutes in a Cowles dissolver. The final product contained 0.75 percent by weight of collagen, and had an apparent viscosity of 23,200 centipoises.

The product was found useful for preparing freeze-dried mats of collagen. About 100 grams of the dispersion was spread as a thin layer in the chamber of a Repp sublimator and cooled to −30° C. Pressure in the chamber was lowered to an average of about 5 microns of mercury over 16 hours. The product was a dry, white, soft, tough, porous, and absorbent mat of nearly pure collagen. This product has many uses, including surgical dressings, disposable diapers, pads, sanitary napkins, sponges, and foam.

Dioxane is particularly useful in manufacturing freeze-dried mats from dispersions because of its relatively high melting point, 11.8° C., compared to isopropanol, −87.9° C. Efficient freeze-drying depends on rapid sublimation of the frozen solvent. Dioxane can be processed at −30° C., but isopropanol requires lower temperatures. It has also been found that dioxane provides mats with a smooth, uniform texture and strength and softness superior to those of freeze-dried collagen mats prepared from any other composition.

Example 3

A mixture of 21.4 pounds of ground, freeze-dried cowhide and 978.6 pounds of 0.01 N HCl was mixed by two passes through a Rietz extructor (Rietz Manufacturing Co., Santa Rosa, Calif.). The gel produced was mixed an additional 10 minutes in the kettle of a high-speed stirrer (Lightnin mixer) to insure a more nearly homogeneous dispersion. The resultant gel had a Brookfield viscosity of 300,000 centipoises.

To 70 pounds of the product was added 30 pounds of C.P. acetone, a ketone, to provide a formulation containing 1.5 weight percent of collagen. This mixture was then passed twice through a Rietz extructor, then homogenized for 10 minutes with a Lightnin mixer. The final dispersion had a Brookfield viscosity of 95,000 centipoises.

The dispersion containing acetone was found useful for preparing collagen fibers. A hypodermic syringe with an exit diameter of about 1 mil was charged with 2 grams of dispersion, which was then extruded into a bath containing acetone only until the fibers were about 2 feet long. The fibers were soaked in the bath for one hour to allow for complete coagulation, then hung to dry in an atmosphere of air at 70° F. and 50 percent relative humidity. The dried fibers were tough, flexible, and elastic. When pulled by hand, they stretched about 10 percent before breaking.

Fibers were also produced by extruding the dilute acid-aqueous gel of this example and the isopropanol dispersion of Example 1 into a bath of acetone in the manner described above. The aqueous gel was difficult to extrude because of its high viscosity.

This example illustrates that this invention can be used in different ways to produce fibers from microcrystalline colloidal collagen dispersions, and that dispersions containing water-miscible organic solvents provide novel fibers by simple processes.

Example 4

A mixture of 0.75 pound of freeze-dried cowhide and 9.25 pounds of 0.03 N HCl was mixed by passing them twice through a Bauer refiner. The temperature was kept below 60° C. The resultant gel was homogenized by mixing it for an additional 10 minutes in a heavy duty rotary mixer. The product was an extremely thick gel that did not flow or break under its own weight. The apparent viscosity exceeded 10,000,000 centipoises.

To 8.0 pounds of the product was added 2.0 pounds of isopropanol to yield formulation containing 6.0 weight percent of hide collagen. The mixture was passed twice through a Bauer refiner, and finally homogenized for 10 minutes with a lightnin mixer. The product was a thick gel with a viscosity of about 1,000,000 centipoises. It was easier to mix and process than the parent gel in this example that did not contain isopropanol. Adding sufficient 0.025 N HCl to the parent gel in order to decrease the collagen content from 7.5 to 6.0 weight percent for closer comparison with the isopropanol gel gave a dispersion with a viscosity greater than 2,000,000 centipoises.

Example 5

A mixture of 2.0 grams of freeze-dried cowhide, 58 grams of 0.01 N HCl, and 40 grams of isopropanol was blended in a Waring Blendor for 15 minutes below 30° C. This formulation contained the same concentrations and ingredients present in the final dispersion of Example 1, which had a collagen concentration of 2.0 weight percent. In this case, however, a dispersion was made by blending hide, dilute acid, and isopropanol in a single step. The product had a viscosity of 30,000 centipoises, which is approximately one-third the viscosity of the final dispersion of Example 1.

Both dispersions were stable. Films prepared from them by the procedure used to prepare the films described in Example 12 had the same tensile properties.

Example 6

A mixture of 0.75 pound of ground, freeze-dried cowhide, 74.25 pounds of 0.01 N HCl and 25 pounds of dioxane was passed twice through a Bauer refiner, then homogenized for 10 minutes with a Lightnin mixer. All mixing was done below 30° C. This formulation contained the same concentrations and ingredients present in the final dispersion of Example 2, which had a collagen concentration of 0.75 weight percent. In this case, however, a dispersion was made by blending hide, dilute acid, and dioxane in a single step.

The product has a viscosity of 7,100 centipoises, which is approximately one-third the viscosity of the final dispersion of Example 2. Both dispersions were stable. Films prepared from them by the procedure used to prepare the films described in Example 12 had the same tensile properties.

Example 7

A mixture of 1.5 pounds of vacuum freeze-dried cowhide, 68.5 pounds of 0.01 N HCl, and 30 pounds of acetone was passed twice through a Pfleiderer mixer, then homogenized for 10 minutes with a Lightnin mixer. All mixing was done below 30° C. This formulation contained the same ingredients and concentrations as those of the final dispersion of Example 3, which had a collagen concentration of 1.5 weight percent. In this case, however, a dispersion was made by blending hide, dilute acid, and dioxane in a single step.

The product had a viscosity of 31,800 centipoises, which is approximately one-third the viscosity of the final dispersion of Example 3. Both dispersions were stable. Films prepared from them by the procedure used to prepare the films described in Example 12 had the same tensile properties.

Example 8

A mixture of 0.6 pound of freeze-dried cowhide, 7.4 pounds of 0.025 N HCl, and 2.0 pounds of isopropanol was passed twice through a Bauer refiner for mixing, then homogenized for 10 minutes with a Lightnin mixer. All mixing was done below 30° C. This formulation contained the same ingredients and concentrations as those of the final dispersion of Example 4, which had a collagen concentration of 6.0 weight percent. In this case, however, a dispersion was made by blending hide, dilute acid, and dioxane in a single step.

The product had a viscosity of 280,000 centipoises, which is approximately one-third the viscosity of the final dispersion of Example 4. Both dispersions were stable. Films prepared from them by the procedure used to prepare the films described in Example 12 had the same tensile properties.

Example 9

A dispersion was prepared in the same manner and containing the same amounts of ingredients as that of Example 1, except that raw cowhide was substituted for vacuum freeze-dried cowhide. The two products were indistinguishable.

The product of this example is useful as a paper binder, and textile sizing material. A mixture of 50 grams of dissolving grade, high alpha cellulose wood pulp was dispersed in 10 liters of water by mixing for one minute. To the slurry was added 5 grams of the 2.0 weight percent collagen dispersion of this example prepared from raw cowhide. The slurry was mixed until uniform, then filtered by suction through a cotton cloth supported on a Buchner funnel. The undisturbed solid mat of residue was dried in air at 70° F. and 50 percent relative humidity. The final product was a tough, fibrous mat that could not be pulled apart by hand. A mat prepared by the same procedure, but with no collagen added to the formulation, gave a weaker mat that could be pulled apart easily by hand. The product also had poor uniformity. Clumps of fibers were observed on the surface. The mat containing collagen was more uniform.

Example 10

A dispersion was prepared in the same manner and containing the same ingredients as that of Example 4, except that raw hide was substituted for freeze-dried hide. The two products were indistinguishable.

Example 11

A mixture of 10 grams of ground, freeze-dried cowhide and 990 grams of 0.01 N HCl was blended in a Cowles dissolver for 15 minutes. The mixture was water-cooled to keep the temperature below 30° C. The product was a thick, stable gel with an apparent viscosity of 42,900 centipoises.

To 750 grams of the product was added 100 grams of dioxane and 150 grams of isopropanol. This mixture was then blended in a Cowles dissolver for 20 minutes. The product contained 0.75 weight percent of collagen, and had an apparent viscosity of 5600 centipoises.

The dispersion of this example had the same concentration of collagen, HCl, and organic solvent (total) as those used in the final dispersion of Example 2. In this case, however, a 1:1.5 mixture of dioxane and isopropanol was used in place of dioxane alone.

This dispersion was evaluated for use in coating paper. A thin layer was spread with a doctor blade to a thickness of about 0.5 mil on board, pulp, and onion skin paper. The mix spread smoothly and adhered uniformly as a continuous layer. The coated papers were dried for several hours at 70° F. and 50 percent relative humidity. They retained their shape; no shrinking or warping was observed. The coating was neither tacky nor greasy. It was written on with ball pen, fountain pen, and pencil without smearing. Absorbing was good and glare was not excessive.

Example 12

A mixture of 4.0 grams of ground, freeze-dried cowhide, 0.04 gram formaldehyde, and 196 grams of 0.01 N HCl was attrited at 5400 r.p.m. in a Cowles dissolver for 15 minutes.

A second mixture was made up the same as the first except that formaldehyde was omitted from the formulation.

To each 100 grams of each dispersion was added 100 grams of isopropanol. The mixtures were blended in a Cowles dissolver for 15 minutes. To the remaining 100 grams of the two formulations without alcohol was added 100 grams of 0.01 N HCl to provide dilute acid-aqueous gels having collagen concentrations the same as that of the two gels with isopropanol. The two dispersions free of isopropanol and the two containing alcohol were de-aerated at room temperature in a vacuum desiccator, spread on a ferrotype plate with a doctor blade to a thickness of 1/8 inch, and dried in air at 70° F. and 50 percent relative humidity for two days.

The dried films were clear and appeared uniform and non-fibrous to the eye. They were tested for tensile strength, elastic modulus, and percentage elongation at break according to the procedure of ASTM Standard D882-61T, "Tensile Properties of Thin Plastic Sheeting." The following specifications were observed for the testing with a table model Instron tensile tester:

(1) Conditioned films at 50 percent relative humidity.
(2) Conditioned films at 73.4±1.8° F.
(3) 1-inch by 6-inch specimens cut with a Thwing-Albert film specimen cutter.
(4) Chart speed of 10 inches per minute.
(5) Cross-head speed of 0.5 inch per minute.
(6) Jaw separation of 4.0 inches.
(7) Full scale load of 20 pounds.
(8) Electrical tape in grips to prevent slippage.

The average thickness of all films was between 0.7 and 1.1 mils.

Tensile properties of films made with the four formulations are summarized in Table I. Tensile strengths ranged from about 10,000 p.s.i. for films without formaldehyde to about 11,000 p.s.i. for those with formaldehyde. The 10 percent difference is attributable to cross-linking of collagen by formaldehyde. There were no differences in tensile elongation at break; they were all about 5 percent.

There is no significant difference between the tensile properties of films prepared from dispersions with or without isopropanol. However, the isopropanol films did possess greater clarity and they appeared to be more uniform. Two processing advantages of using isopropanol dispersions in this application are that their viscosity is lower and they support higher loadings, which makes possible the casting of thicker films by a single step.

TABLE I.—MECHANICAL PROPERTIES OF HAND CAST FILMS PREPARED FROM COLLAGEN DISPERSIONS

| Dispersion Formulation | Tensile Strength (p.s.i.) | Elastic Modulus (p.s.i.) ($\times 10^{-5}$) | Tensile Elongation At Break (percent) |
|---|---|---|---|
| (1) 1% Collagen Gel in 0.01 N HCl. | 14,100 | 3.72 | 9.0 |
| | 8,400 | 4.03 | 2.8 |
| | 2,800 | 3.74 | 0.83 |
| | 12,900 | 4.22 | 6.0 |
| | 13,900 | 4.02 | 7.9 |
| | 6,600 | 4.06 | 1.9 |
| | 9,900 | 3.90 | 3.6 |
| | 8,700 | 4.03 | 3.0 |
| Averages | 9,660 | 3.97 | 4.39 |
| (2) 1% Collagen Gel in 0.01 N HCl with 2% $CH_2O$. | 13,200 | 3.95 | 7.1 |
| | 9,700 | 3.85 | 3.7 |
| | 10,300 | 3.70 | 4.3 |
| | 10,000 | 3.55 | 4.8 |
| | 11,100 | 3.77 | 5.8 |
| Averages | 10,900 | 3.76 | 5.11 |
| (3) 1% Collagen Gel in 50% 0.01 N HCl and 50% Isopropyl Alcohol. | 7,800 | 3.17 | 4.3 |
| | 9,400 | 3.42 | 5.3 |
| | 9,600 | 3.82 | 4.6 |
| | 10,500 | 3.91 | 6.3 |
| | 10,000 | 3.76 | 5.3 |
| Averages | 9,470 | 3.62 | 5.11 |
| (4) 1% Collagen Gel in 50% 0.01 N HCl and 50% Isopropyl Alcohol with 2% $CH_2O$. | 8,700 | 3.75 | 3.6 |
| | 10,900 | 4.16 | 5.7 |
| | 12,700 | 4.26 | 7.3 |
| | 10,600 | 4.64 | 3.6 |
| | 11,400 | 4.47 | 5.0 |
| Averages | 10,900 | 4.26 | 5.04 |

Example 13

A 6% microcrystalline collagen gel was prepared as described in Example 4 in approximately a 25/75 isopropanol/water medium. This gel was warmed in a water bath to 60° C., then filtered through a 270 mesh stainless steel screen to remove dirt and other foreign particles. It was then spun into fibers by means of a two-bath system using conventional rayon spinning equipment. Bath number 1 was isopropanol at 0° C., and the hold time in the bath was 20 minutes. The fibers were made into skeins from bath number 1 and immersed in bath number 2 comprising isopropanol at 25° C. containing 10% of a formaldehyde-based (Aerotex 23) cross-linking agent. Hold time was 10 minutes. The skein was placed on a reel and unwound, stretched and dried between heated rolls, and collected on a bobbin. The resulting fibers were quite wool-like, possessed excellent resilience, and good tensile strengths.

Example 14

Same as Example 13, except the gel after warming and filtration was "dry spun" into a long vertical tube—similar to that used for cellulose acetate fiber manufacture—and converted to a dry product directly without the two-bath wet spinning procedure.

Example 15

A 6% microcrystalline collagen spinning gel was prepared by dispersing freeze-dried pulverized technical hide collagen in a mixture comprising 50% isopropanol/25% dimethyl sulfoxide/25% water, in which had already been dissolved HCl in an amount to be 0.025 M, on the basis of total water plus solvent.

This was dispersed in a Cowles disintegrator and the temperature was not allowed to exceed 60° C. The warm dispersion was filtered, and then hand cast into films and extruded into monofilaments by means of a hypodermic syringe.

Films cast from this medium were clearer than from a binary isopropanol/water solvent. Furthermore, the spun monofilaments had tensile strengths that appeared greater than similar monofilaments prepared in the same manner from an isopropanol/water solvent medium.

Example 16

A 2% microcrystalline collagen gel was prepared in

100% dimethyl sulfoxide, containing 0.025 M HCl based on the weight of the solvent, using a Waring Blendor, and keeping the temperature below 60° C. Films hand cast from this dispersion dried slowly in air, because of the high boiling point of dimethyl sulfoxide. However, when completely dried, these films were the clearer and tougher than films similarly prepared from the 100% water, or the organic-solvent/water media, respectively.

Example 17

Example 13 was repeated except that a single coagulation bath was used comprising 90% isopropanol, 5% dimethyl sulfoxide, and 5% water at 25° C. The results were essentially similar to those obtained in Example 13.

Obviously, the examples can be multiplied indefinitely without departing from the scope of the invention, as defined in the claims.

We claim:

1. A composition comprising a dispersion of collagen, of which at least 10% by weight is in the form of microcrystalline particles, having a maximum size in any direction of about one micron, and consisting of an aggregate of tropocollagen units measuring at least 25 angstrom units in thickness, the composition being substantially free of tropocollagen and its degradation products; said collagen being present in an amount of at least about 0.75% by weight and being dispersed in a dispersing medium from the class consisting of (a) dimethyl sulfoxide, (b) mixtures of water and dimethyl sulfoxide, (c) dimethyl sulfoxide-free mixtures of water and water-miscible organic solvents in an amount not exceeding 65% by weight of the mixture and (d) mixtures of water, dimethyl sulfoxide, and at least one other water-miscible organic solvent, the mixture containing not over 75% of said other organic solvent.

2. The composition of claim 1 in which the dispersing medium consists essentially of a dimethyl sulfoxide-free mixture of water and water-miscible organic solvents, the water comprising at least 65% by weight of the dispersing medium.

3. The composition of claim 1 in which the dispersing medium consists essentially of dimethyl sulfoxide.

4. The composition of claim 1 in which the dispersing medium consists essentially of a mixture of water and dimethyl sulfoxide.

5. The composition of claim 1 in which the dispersing medium consists essentially of a mixture of water, dimethyl sulfoxide, and at least one other water-miscible organic solvent, the mixture containing not over 75% of said other organic solvent.

6. The method of producing a dispersion containing at least about 0.75%, by weight, of collagen which comprises treating the collagen with a mixture of a dispersing agent of the class consisting of (a) dimethyl sulfoxide, (b) mixtures of water and dimethyl sulfoxide, (c) dimethyl sulfoxide-free mixtures of water and water-miscible organic solvents in an amount not exceeding 65% by weight of the mixture and (d) mixtures of water, dimethyl sulfoxide, and at least one other water-miscible organic solvent, the mixture containing not over 75% of said other organic solvent, and containing from 0.0025 to 0.03 molar acid based on the total dispersing medium and thereafter subjecting the mixture to mechanical attrition until at least 10% by weight of the collagen has been reduced to particle size having a maximum size in any direction of about one micron and consisting of an aggregate of tropocollagen units measuring at least 25 angstrom units in thickness.

7. The method of claim 6 in which the collagen concentration is under 2% and the acid concentration is under .025 molar.

8. The method of claim 6 in which the collagen concentration is above 5% and the acid concentration is from .025 molar to .03 molar.

9. The method of making the composition of claim 1 which comprises uniformly distributing through a body of undenatured natural fibrous collagen an aqueous solution of an aicid with a hydrogen ion concentration of at least 0.0025 mole per liter, and up to 0.02 mole per liter where the collagen concentration is under 2%, and up to 0.03 mole per liter where the collagen concentration is of the range of 5–6%, comminuting the wet mass until at least 10% of the particles have been reduced to a particle size of a maximum dimension in any direction of about one micron and consisting of an aggregate of tropocollagen units measuring at least 25 angstrom units in thickness and then adding at least 20% by weight of at least one water-miscible organic solvent to the mass, the amount of organic solvent added not exceeding the amount that precipitates the collagen particles.

References Cited

UNITED STATES PATENTS

| | | | |
|---|---|---|---|
| 3,203,817 | 8/1965 | Phelisse et al. | 106—141 |
| 2,993,794 | 7/1961 | Moshey | 167—82 |

JAMES A. SEIDLECK, Primary Examiner.

DONALD J. ARNOLD, Examiner.

T. MORRIS, Assistant Examiner.